United States Patent
Shibata et al.

(10) Patent No.: US 10,987,637 B2
(45) Date of Patent: Apr. 27, 2021

(54) DDR-TYPE ZEOLITE SEED CRYSTAL AND METHOD FOR MANUFACTURING DDR-TYPE ZEOLITE MEMBRANE

(71) Applicant: NGK INSULATORS, LTD., Nagoya (JP)

(72) Inventors: Hiroyuki Shibata, Nagoya (JP); Akimasa Ichikawa, Nagoya (JP); Naoto Kinoshita, Nagoya (JP); Takeshi Hagio, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 197 days.

(21) Appl. No.: 15/706,875

(22) Filed: Sep. 18, 2017

(65) Prior Publication Data

US 2018/0001276 A1   Jan. 4, 2018

Related U.S. Application Data

(63) Continuation of application No. PCT/JP2016/059044, filed on Mar. 22, 2016.

(30) Foreign Application Priority Data

Mar. 31, 2015   (JP) .............. JP2015-071569

(51) Int. Cl.
| | |
|---|---|
| *B01D 71/02* | (2006.01) |
| *B01D 69/10* | (2006.01) |
| *B01D 53/22* | (2006.01) |
| *B01D 67/00* | (2006.01) |
| *C01B 37/02* | (2006.01) |
| *C01B 39/48* | (2006.01) |

(52) U.S. Cl.
CPC ......... *B01D 71/028* (2013.01); *B01D 53/228* (2013.01); *B01D 67/0046* (2013.01); *B01D 67/0051* (2013.01); *B01D 69/10* (2013.01); *C01B 37/02* (2013.01); *C01B 39/48* (2013.01)

(58) Field of Classification Search
CPC ............ B01D 71/028; B01D 53/228; B01D 67/0046; B01D 67/0051; B01D 69/10
See application file for complete search history.

(56) References Cited

U.S. PATENT DOCUMENTS

| | | | |
|---|---|---|---|
| 2008/0047432 A1 | 2/2008 | Nonaka et al. | |
| 2008/0214686 A1 | 9/2008 | Suzuki et al. | |
| 2009/0011926 A1* | 1/2009 | Yajima ................ | B01D 53/228 502/62 |

(Continued)

FOREIGN PATENT DOCUMENTS

| | | |
|---|---|---|
| CN | 101400605 A | 4/2009 |
| CN | 104245586 A | 12/2014 |

(Continued)

OTHER PUBLICATIONS

German Office Action (Application No. 11 2016 001 561.5) dated Jan. 9, 2019 (with English translation).

(Continued)

*Primary Examiner* — Kelly M Gambetta
(74) *Attorney, Agent, or Firm* — Burr & Brown, PLLC

(57) ABSTRACT

A DDR-type zeolite seed crystal has an average particle diameter of less than or equal to 0.2 μm, and an average aspect ratio of less than or equal to 1.3.

2 Claims, 2 Drawing Sheets

(56) References Cited

U.S. PATENT DOCUMENTS

| | | | |
|---|---|---|---|
| 2012/0009120 A1* | 1/2012 | Cho | B01D 67/0051 |
| | | | 423/709 |
| 2015/0010704 A1* | 1/2015 | Hagio | B01D 53/228 |
| | | | 427/245 |
| 2016/0361691 A1 | 12/2016 | Hagio et al. | |

FOREIGN PATENT DOCUMENTS

| | | | |
|---|---|---|---|
| JP | 2004-082008 A1 | 3/2004 | |
| JP | WO2007/105407 A1 | 9/2007 | |
| JP | 2008-074695 A1 | 4/2008 | |
| JP | WO2013/147327 A1 | 10/2013 | |
| WO | 2007/058387 A1 | 5/2007 | |
| WO | WO-2013147327 A1 * | 10/2013 | B01D 53/228 |

OTHER PUBLICATIONS

International Search Report and Written Opinion (Application No. PCT/JP2016/059044) dated May 31, 2016.
English translation of International Preliminary Report on Patentability (Chapter I) (Application No. PCT/JP2016/059044) dated Oct. 12, 2017, 8 pages.
Chinese Office Action (with English translation), Chinese Application No. 201680011591.X, dated Sep. 4, 2019 (12 pages).

* cited by examiner

DDR-TYPE ZEOLITE SEED CRYSTAL AND METHOD FOR MANUFACTURING DDR-TYPE ZEOLITE MEMBRANE

BACKGROUND OF THE INVENTION

1. Field of the Invention

The present invention relates to a DDR-type zeolite seed crystal and to a method for manufacturing a DDR-type zeolite membrane.

2. Description of Related Art

A method is known of forming a DDR-type zeolite membrane on a surface of a support by use of a DDR-type zeolite seed crystal (referred to below as "seed crystal") (for example, reference is made to Patent Literature 1 and 2). The DDR-type zeolite membrane is formed by crystalline growth in a membrane configuration of a seed crystal that has been coated onto the surface of the support.

CITATION LIST

Patent Literature

[Patent Literature 1] Japanese Patent Application Laid-Open No. 2004-82008
[Patent Literature 2] Japanese Patent Application Laid-Open No. 2008-74695

SUMMARY OF THE INVENTION

Technical Problem

In this context, there is a tendency for the separation performance of a DDR-type zeolite membrane to be enhanced as density increases and for the permeation performance of a DDR-type zeolite membrane to be enhanced as membrane thickness decreases. However, it is not an easy task to achieve both separation performance and permeation performance due to the fact that the membrane thickness is increased when crystal growth eliminates spaces between seed crystals to thereby enhance density.

The present invention is proposed based on the situation above, and has the object of providing a DDR-type zeolite seed crystal and a method for manufacturing a DDR-type zeolite membrane that enhances the separation performance and permeation performance of the DDR-type zeolite membrane.

Solution to Problem

The DDR-type zeolite seed crystal according to the present invention has an average particle diameter of less than or equal to 0.2 μm (micrometers), and has an average aspect ratio of less than or equal to 1.3.

Advantageous Effects of Invention

According to the present invention, it is possible to provide a DDR-type zeolite seed crystal and a method for manufacturing a DDR-type zeolite membrane that enhances the separation performance and permeation performance of the DDR-type zeolite membrane.

DETAILED DESCRIPTION OF THE INVENTION

DDR-Type Zeolite Seed Crystal

Figure 1:
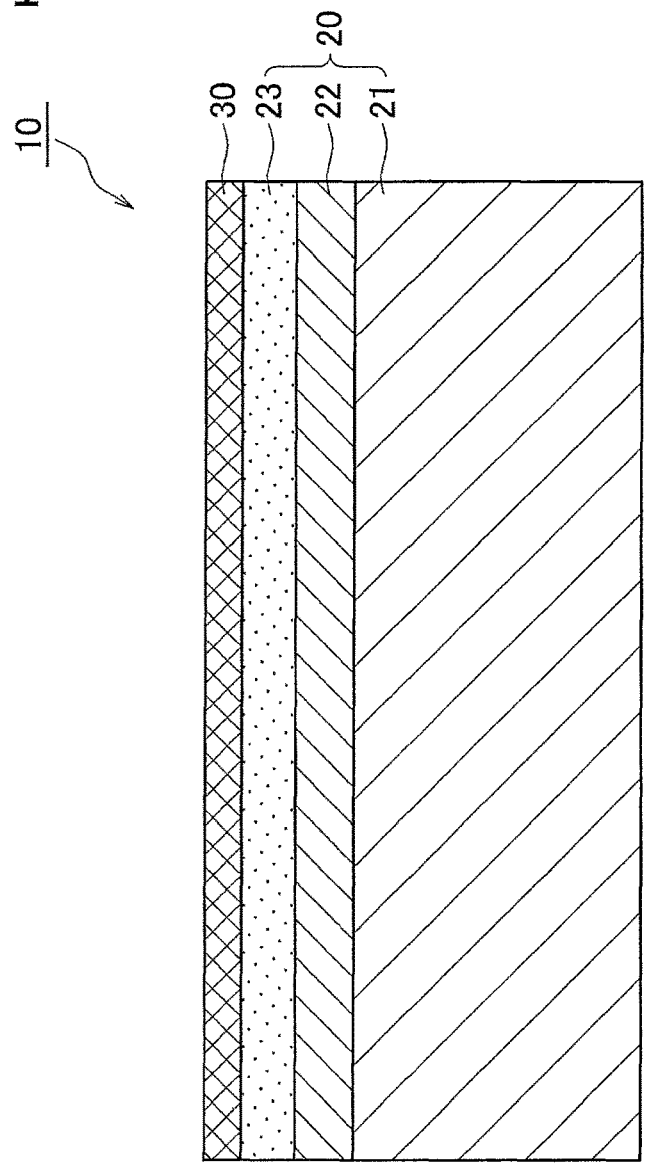
FIG. 1 is a cross-sectional view of a separation membrane structure.

The average particle diameter of a DDR-type zeolite seed crystal according to the present embodiment (referred to below as "seed crystal") is less than or equal to 0.2 μm. The spaces between the seed crystals that are coated onto a surface of a support can be reduced when the average particle diameter is less than or equal to 0.2 μm.

It is preferred that the average particle diameter of the seed crystals is greater than or equal to 0.05 μm. An average particle diameter of greater than or equal to 0.05 μm makes it possible to avoid a decrease in the permeation amount of the separation membrane structure since it is not necessary to excessively reduce the pore diameter in the support to inhibit dispersion of the seed crystals into the pores of the support.

In the present embodiment, the average particle diameter of the seed crystals is the central value of the particle diameter by volume and may be measured by a dynamic light-scattering method. More specifically, a suspension is obtained by dripping a aqueous dispersion of the seed crystals into water to thereby create a measureable concentration and dispersing by use of ultrasonic waves, and then the particle diameter distribution is measured using a dynamic light-scattering particle diameter distribution measurement device. A median diameter (D50) that is calculated based on the measured particle size distribution is taken to be the average particle diameter of the seed crystals.

The average aspect ratio of the seed crystals is less than or equal to 1.3. An average seed-crystal aspect ratio of less than or equal to 1.3 enhances the density of the coated seed crystals. The lower limiting value of the average aspect ratio of the seed crystals is 1.0.

In the present embodiment, the aspect ratio of the seed crystals is a value obtained by dividing the maximum Feret diameter by the minimum Feret diameter (maximum Feret diameter/minimum Feret diameter). The maximum Feret diameter is the maximum distance of two parallel straight lines that sandwich a seed crystal on a field emission scanning electron microscope (FE-SEM) image of a seed crystal. The minimum Feret diameter is the minimum distance of two parallel straight lines that sandwich a seed crystal on an FE-SEM image of the seed crystal. The maximum Feret diameter and the minimum Feret diameter can be measured using an in-lens FE-SEM. The average aspect ratio of the seed crystals is the value of the arithmetic mean for the aspect ratio of 20 seed crystals that are arbitrarily selected on an FE-SEM image. When calculating the average aspect ratio of the seed crystals, in the event that there are not 20 seed crystals available on a single FE-SEM image, 20 seed crystals may be arbitrarily selected on a plurality of FE-SEM images.

The crystallinity index of the seed crystals is preferably greater than or equal to 60. A crystallinity index is a representative value that indicates an abundance ratio of DDR-type zeolite crystals to amorphous configurations. The membrane formation characteristics of the DDR-type zeolite membrane are enhanced due to the reduction of the presence of amorphous configurations as a result of a crystallinity index of the seed crystals being greater than or equal to 60.

In the present embodiment, the crystallinity index is the value of (A–C)/(B–C) when A denotes the diffraction intensity of a diffraction peak on a surface (024) that is obtained by XRD (powder X-ray diffraction) measurement, B denotes the minimum value of the diffraction intensity between the peaks on the surface (024) and a surface (116), and C denotes the minimum value of the diffraction intensity between the peaks on the surface (024) and a surface (202).

Method of Manufacturing DDR-Type Zeolite Seed Crystal

An example of a manufacturing method for a seed crystal will be described.

Firstly, a nucleus that contains DDR-type zeolite (referred to below as "nucleus") is prepared. The nucleus is preferably a DDR-type zeolite crystal, or a mixture of a DDR-type zeolite crystal and amorphous silica. The average particle diameter of the nucleus can be configured as 0.100 μm to 0.200 μm. The average particle diameter of the nucleus can be measured using a dynamic light-scattering method. There is no particular limitation on the method of manufacturing the nucleus.

Next, a starting material solution (starting material sol) is prepared that contains a nucleus, silica, and 1-adamantane amine as a structure regulating agent. The starting material solution may also contain water, ethylene diamine, or the like. The concentration of the nucleus in the starting material solution may be greater than or equal to 0.4 mass %, and is preferably greater than or equal to 0.5 mass %.

The seed crystal is produced by heating (hydrothermal synthesis) the starting material solution to 110 to 150 degrees C. for greater than or equal to 4 hours. At that time, it is possible to reduce the aspect ratio of the seed crystals by reducing the heating temperature and reduce the aspect ratio of the seed crystals by increasing the heating time. The heating period for the starting material solution is preferably greater than or equal to 24 hours.

Next, the seed crystals are dispersed in a dispersion medium (water, type of alcohol, or the like) and a dispersion having a pH adjusted to greater than or equal to 7.5 is cleaned using a vibration method or ultrasonic wave method.

In the above manner, a seed crystal can be produced that has an average particle diameter of less than or equal to 0.2 μm, and an aspect ratio of less than or equal to 1.3.

Due to the fact that the above method of manufacture does not employ a mechanical process (for example, pulverization or cleavage), it is possible to obtain seed crystals having a crystallinity index of greater than or equal to 57.

Configuration of Separation Membrane Structure 10

FIG. 1 is a cross-sectional view of a separation membrane structure 10. The separation membrane structure 10 includes a support 20 and a DDR-type zeolite membrane 30.

The support 20 supports the DDR-type zeolite membrane 30. The support 20 exhibits chemical stability that enables the formation (crystallization, coating, or precipitation) of the DDR-type zeolite membrane 30 in a membrane configuration on a surface. The support 20 may be configured in a shape to enable supply to the DDR-type zeolite membrane 30 of a mixed fluid that is the subject matter to be separated. The shape of the support 20 for example may be configured in a honeycomb, monolithic, flat, tubular, cylindrical, columnar, square column shape, or the like. In the present embodiment, the support 20 includes a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, silver, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The average pore diameter of the substrate 21 may be configured for example as 5 μm to 25 μm. The average pore diameter of the substrate 21 may be measured by use of a mercury porosimeter. The porosity of the substrate 21 may be configured for example as 25% to 50%. The average particle diameter of the porous material that configures the substrate 21 may be configured for example as 5 μm to 100 μm. The average particle diameter of the substrate 21 is the value of the arithmetic mean for the maximum diameter of 30 measured particles that are measured by cross sectional micro-structure observation by use of a scanning electron microscope (SEM).

The intermediate layer 22 is formed on the substrate 21. The intermediate layer 22 can be configured by the same porous material as that used in the substrate 21. The average pore diameter of the intermediate layer 22 may be smaller than the average pore diameter of the substrate 21, and may be configured for example as 0.005 μm to 2 μm. The average pore diameter of the intermediate layer 22 may be measured by use of a perm-porometer. The porosity of the intermediate layer 22 may be configured for example as 20% to 60%. The thickness of the intermediate layer 22 may be configured for example as 30 μm to 300 μm.

The surface layer 23 is formed on the intermediate layer 22. The surface layer 23 can be configured by the porous material that can be used in the substrate 21. The average pore diameter of the surface layer 23 may be smaller than the average pore diameter of the intermediate layer 22, and for example may be 0.001 μm to 0.5 μm. The average pore diameter of the surface layer 23 may be measured by use of a perm-porometer. The porosity of the surface layer 23 may be configured for example to 20% to 60%. The thickness of the surface layer 23 for example may be configured as 1 μm to 50 μm.

The DDR-type zeolite membrane 30 is formed by using the seed crystal described above. Consequently, DDR-type zeolite membrane 30 exhibits superior separation characteristics and permeation characteristics. The method of manufacturing the DDR-type zeolite membrane 30 will be described below.

The DDR-type zeolite membrane 30 includes a principal component of a DDR-type zeolite. The zeolite membrane 30 may contain an inorganic binder (silica or alumina, or the like), an organic binder (polymer or the like) and a silylating agent, or the like. In the present embodiment, the term composition X "contains as a principal component" composition Y means that composition Y occupies at least 60 wt % of the total of composition X.

Method of Manufacturing Separation Membrane Structure

A method of manufacturing the separation membrane structure 10 will be described.

Firstly, a green body for the substrate 21 is formed into a desired shape by use of extrusion molding, a press molding method, a slip cast method, or the like. Next, the green body for the substrate 21 is fired (for example, 900 degrees C. to 1450 degrees C.) to thereby form the substrate 21.

Then, an intermediate layer slurry is formulated by use of a ceramic material having a desired particle radius and is formed as a membrane on a surface of the substrate 21 to thereby form a green body for the intermediate layer 22. Next, the green body for the intermediate layer 22 is fired (for example, 900 degrees C. to 1450 degrees C.) and to thereby form the intermediate layer 22.

Then, a surface layer slurry is formulated by use of a ceramic material having a desired particle radius and is formed as a membrane on a surface of the intermediate layer 22 to thereby form a green body for the surface layer 23. Next, the green body for the surface layer 23 is fired (for example, 900 degrees C. to 1450 degrees C.) and to thereby form the surface layer 23.

Then, A seed crystal manufactured as described in the above method is prepared.

Next, the slurry that disperses the seed crystals in alcohol is coated onto the surface of the surface layer 23 by a method such as a flow-down method, a dipping method or the like. At that time, the average particle diameter of the seed crystals is less than or equal to 0.2 μm, and since the aspect ratio is less than or equal to 1.3, the packing characteristics (coverage) on the surface of the surface layer 23 by the seed crystals can be increased.

The deposition amount of seed crystals can be controlled by the content ratio of seed crystals in the slurry, and the content ratio of seed crystals is preferably 0.001 mass % to 0.5 mass %. Difficulty in relation to formation of a DDR-type zeolite membrane can be inhibited when the content ratio of the seed crystals is greater than or equal to 0.001 mass %. A lack of uniformity in the thickness of the DDR-type zeolite membrane can be inhibited when the content ratio of the seed crystals is less than or equal to 0.5 mass %. The content ratio of the seed crystals is preferably 0.01 mass % to 0.4 mass % and more preferably 0.05 to 0.3 mass %.

Next, the support 20 is immersed inside a pressure-resistant vessel containing a starting material solution that includes a silica source, an alumina source, an alkali source, and water or the like. An organic template may be included in the starting material solution.

Next, the pressure-resistant vessel is placed in a drying device and subjected to heating (hydrothermal synthesis) for about 1 to 240 hours at 100 to 200 degrees C. to thereby cause crystal growth of the seed crystal into a membrane configuration. Since the high packing characteristics on the surface of the surface layer 23 by the seed crystals enable formation of a dense DDR-type zeolite membrane 30 in a short time period.

Next, the support 20 forming the DDR-type zeolite membrane 30 is washed and dried at 80 to 100 degrees C.

Then, in a configuration in which an organic template is included in the starting material solution, the support 20 is placed in an electric furnace, and heated in an atmosphere of air (400 to 800 degrees C., 1 to 200 hours) to thereby combust and remove the organic template.

Characteristics

Figure 2A:
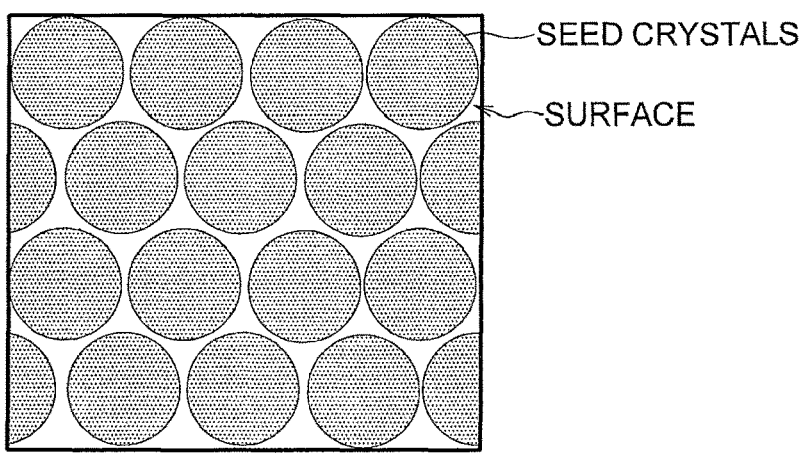
FIG. 2A is a schematic view illustrating the coating configuration of a seed crystal according to a comparative example.
Figure 2B:
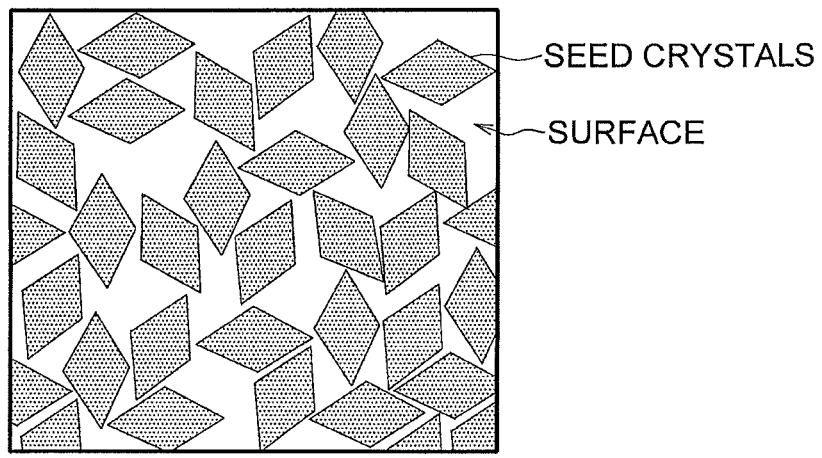
FIG. 2B is a schematic view illustrating the coating configuration of a seed crystal according to a comparative example.
Figure 2C:
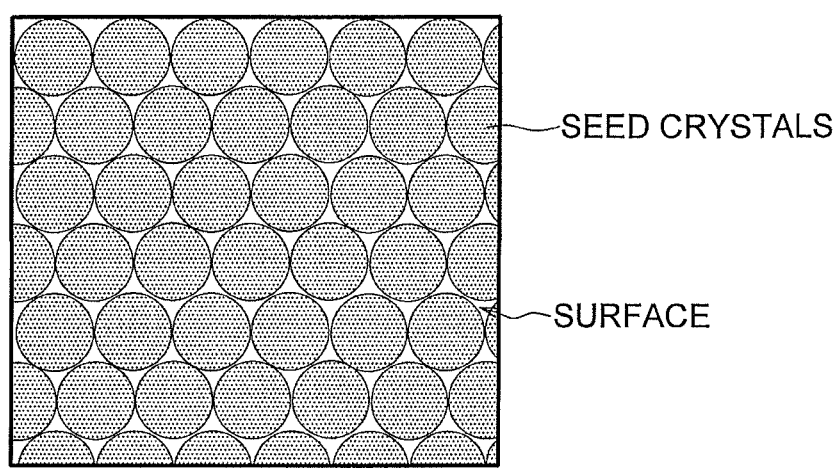
FIG. 2C is a schematic view illustrating the coating configuration of a seed crystal according to an example.

The seed crystals according to the present embodiment have an average particle diameter of less than or equal to 0.2 μm, and an aspect ratio of less than or equal to 1.3. Therefore, the packing characteristics on the surface of the surface layer 23 by the seed crystals can be increased (reference is made to FIG. 2C) in comparison to a configuration in which the average particle diameter is greater than or equal to 0.2 μm (reference is made to FIG. 2A) or a configuration in which the aspect ratio is greater than or equal to 1.3 (reference is made to FIG. 2B). As a result, since a dense DDR-type zeolite membrane 30 can be formed in a short time period, both separation characteristics and permeation characteristics can be enhanced by the thin film configuration and the density of the DDR-type zeolite membrane 30.

Other Embodiments

In the present embodiment, although the support 20 includes the substrate 21, the intermediate layer 22 and the surface layer 23, one or both of the intermediate layer 22 and the surface layer 23 may be omitted.

In the present embodiment, although the separation membrane structure 10 includes the support 20 and the DDR-type zeolite membrane 30, a functional membrane or a protective membrane may be further provided in a stacked configuration onto the DDR-type zeolite membrane 30. This type of membrane may be an inorganic membrane such a DDR-type zeolite membrane, carbon membrane, silica membrane, or the like, or may be an organic membrane such as a polyimide membrane, silicone membrane or the like.

Examples

The examples of the present invention will be described below. However, the present invention is not thereby limited to the following examples.

Preparation of Sample No. 1 to No. 11

Firstly, after placing 12.63 g of ethylene diamine (manufactured by Wako Pure Chemical Industries, Ltd.) in a fluororesin sealed container, 1.98 g of 1-adamantane amine (manufactured by Sigma Aldrich) was added, and the 1-adamantane amine was dissolved by ultrasonic waves.

Next, 149.45 g of an aqueous solution containing 0.90 mass % of a DDR-type zeolite crystal as a nucleus was placed in another container, and 97.90 g of a silica sol containing 30 mass % of silica (Snowtex S, manufactured by Nissan Chemical Industries, Ltd.) was added and stirred to thereby prepare a silica sol containing a nucleus. The DDR-type zeolite crystal for use as a nucleus was prepared based on the method disclosed in PCT Laid Open Application 2010/090049A1 in which a DDR zeolite powder having an average particle diameter of 2.9 μm was pulverized using a bead mill (Product Name: Star Mill) manufactured by Ashizawa Finetech Ltd. and then coarse particles were removed by centrifugation. The average particle diameter of the nucleus was shown in Table 1.

Next, the silica sol containing the nucleus that had been prepared in advance was added to the sealed container containing the ethylene diamine in which 1-adamantane amine was dissolved and stirred to thereby obtain a starting material solution (starting material sol). The concentration of the nucleus in the starting material solution was shown in Table 1.

Next, the starting material solution was placed in a stainless steel pressure-resistant container including an inner tube of fluorocarbon resin and heated (hydrothermal synthesis) under the conditions shown in Table 1.

Next, a dispersion was obtained in which the DDR-type zeolite seed crystals were dispersed by rinsing the solution after hydrothermal synthesis.

Next, the seed crystal dispersion was subjected to ultrasonic waves, then the seed crystal dispersion was dripped into ethanol and stirred to prepare a seeded slurry having a concentration of seed crystals of 0.075 mass %.

Next, the seeded slurry was poured from above a monolithic support that was configured in a vertical position (diameter 30 mm×length 160 mm, average pore diameter 0.10 μm) so that the seeded slurry flowed into cells formed in the support.

Next, air was caused to flow into the cells for 10 minutes at room temperature at a rate of 2 to 7 m/sec to thereby dry the seeded slurry that was coated onto the walls of the cells.

Next, the coating and drying of the seed slurry was repeated using the above methods.

Next, after placing 2.252 g of ethylene diamine (manufactured by Wako Pure Chemical Industries, Ltd.) in a fluororesin container, 0.354 g of 1-adamantane amine (manufactured by Sigma Aldrich) was added and dissolved.

Then, 30.02 g of a silica sol containing silica (Snowtex S, manufactured by Nissan Chemical Industries, Ltd.) and 35.71 g of ion exchange water were added to another container and stirred to thereby prepare a silica dispersion.

Next, an ethylene diamine solution containing dissolved 1-adamantane amine was added into the silica dispersion and stirred, and then diluted using ion exchange water to prepare a membrane-forming starting material solution.

Then, the support with the seed crystals attached was placed in a stainless steel pressure-resistant container including an inner tube of fluorocarbon resin.

Next, the DDR-type zeolite membrane containing 1-adamantane amine was formed on the cell walls of the support by placing the membrane-forming starting material solution in a vessel and heating (hydrothermal synthesis) for 20 hours at 125 degrees C.

Then, the support was tacked from the vessel, washed in water and dried at 80 degrees C. for 16 hours.

Measurement of Average Particle Diameter of Seed Crystals

After dripping the seed crystal dispersion of each sample into approximately 20 ml of water to configure a measureable concentration, a suspension of the seed crystals was obtained by creating a dispersion by use of ultrasonic waves for at least 5 minutes.

Next, the particle size distribution of the suspension was measured by use of a dynamic light-scattering particle diameter distribution measurement device (manufactured by Nikkiso, Product Name: Nanotrac).

Then, the median diameter (D50) of the particle size distribution was obtained as an average particle diameter. The average particle diameter of the seed crystals in each sample was shown in Table 1.

Measurement of Aspect Ratio of Seed Crystals

An FE-SEM (manufactured by ZEISS, Product Name (Model Number) ULTRA55) image was extracted from the seed crystal dispersion of each sample.

Next, the average aspect ratio (arithmetic mean of maximum Feret diameter/minimum Feret diameter) of 20 seed crystals in the FE-SEM image was calculated. The average aspect ratio of the seed crystals in each sample was shown in Table 1.

Measurement of Crystallinity Index of Seed Crystal

After drying the seed crystal dispersion of each sample for 1 hour at 120 degrees C., a diffraction intensity (A) of a diffraction peak on a surface (024) of seed crystals that had been configured as a powder by use of an agate magnetic pestle, a minimum value (B) of the diffraction intensity between the peaks on the surface (024) and a surface (116), and a minimum value (C) of the diffraction intensity between the peaks on the surface (024) and a surface (202) were obtained by use of an X-ray diffraction device (manufactured by Rigaku Corporation, Product Name (Model Number) RINT-2500).

Next, (A−C)/(B−C) was calculated as the crystallinity index based on the measured values. The crystallinity index of the seed crystals in each sample was shown in Table 1.

Measurement of $N_2$ Permeation Amount in DDR-Type Zeolite Membrane

The $N_2$ permeation amount was measured to evaluate the density of the DDR-type zeolite membrane in each sample. More specifically, 100 KPa of $N_2$ gas was introduced into the cells of the support and the permeation amount of the $N_2$ gas that permeates the support was measured using a mass flow meter. The measurement results were shown in Table 1.

TABLE 1

| Sample No. | Nucleus of DDR-Type Zeolite Crystal Average Particle Diameter (μm) | Nucleus Concentration (Mass %) | Heating Temperature During Seed Crystal Preparation (° C.) | Heating Time During Seed Crystal Preparation (h) | Seed Crystal Average Particle Diameter (μm) | Average Aspect Ratio | Crystallinity Index |
|---|---|---|---|---|---|---|---|
| 1 | 0.152 | 0.43 | 140 | 24 | 0.190 | 1.11 | 81 |
| 2 | 0.135 | 1.50 | 140 | 24 | 0.147 | 1.13 | 63 |
| 3 | 0.152 | 0.51 | 150 | 24 | 0.192 | 1.30 | 84 |
| 4 | 0.152 | 1.10 | 150 | 24 | 0.166 | 1.28 | 73 |
| 5 | 0.152 | 0.59 | 110 | 92 | 0.180 | 1.14 | 60 |
| 6 | 0.152 | 1.17 | 110 | 60 | 0.148 | 1.16 | 57 |
| 7 | 0.154 | 0.35 | 160 | 16 | 0.233 | 1.52 | 85 |
| 8 | 0.150 | 0.29 | 140 | 16 | 0.215 | 1.20 | 76 |
| 9 | 0.124 | 3.00 | 140 | 12 | 0.152 | 1.38 | 65 |
| 10 | 0.168 | 1.10 | 160 | 16 | 0.186 | 1.58 | 75 |
| 11 | 0.152 | 0.17 | 110 | 92 | 0.234 | 1.15 | 63 |

| Sample No. | DDR-type Zeolite Membrane Seeding Slurry Concentration (mass %) | Synthesis Temperature (° C.) | Synthesis Time (h) | $N_2$ Permeation Amount (L/min · m$^2$) |
|---|---|---|---|---|
| 1 | 0.075 | 125 | 20 | 0.0003 |
| 2 | 0.075 | 125 | 20 | 0.0002 |

TABLE 1-continued

| | | | | |
|---|---|---|---|---|
| 3 | 0.075 | 125 | 20 | 0.0002 |
| 4 | 0.075 | 125 | 20 | 0.0002 |
| 5 | 0.075 | 125 | 20 | 0.0002 |
| 6 | 0.075 | 125 | 20 | 0.0034 |
| 7 | 0.075 | 125 | 20 | 9.22 |
| 8 | 0.075 | 125 | 20 | 6.95 |
| 9 | 0.075 | 125 | 20 | 0.76 |
| 10 | 0.075 | 125 | 20 | 1.53 |
| 11 | 0.075 | 125 | 20 | 1.05 |

As shown in Table 1, an $N_2$ permeation amount in the DDR-type zeolite membrane could be sufficient inhibited in Sample No. 1 to No. 6 in which seed crystals were used that had an average particle diameter of less than or equal to 0.2 µm and an aspect ratio of less than or equal to 1.3. This feature is due to the fact that a dense DDR-type zeolite membrane was formed in a short period of time by increasing the packing characteristics of the seed crystals on the cell surface.

On the other hand, an $N_2$ permeation amount in the DDR-type zeolite membrane was not inhibited in Sample No. 7 to No. 11 in which seed crystals were used that had an average particle diameter of greater than 0.2 µm and/or an aspect ratio of greater than 1.3. This feature is due to the fact that a dense DDR-type zeolite membrane was not formed under the same synthesis conditions as Sample No. 1 to No. 6 since the packing characteristics of the seed crystals on the cell surface were low. A dense membrane in Sample No. 7 to No. 11 requires promotion of crystal growth by increasing the hydrothermal synthesis time or the like and is not preferred since the increased membrane thickness results in low permeation characteristics.

As shown above, the separation characteristics and permeation characteristics of a DDR-type zeolite membrane could be enhanced by use of seed crystals that had an average particle diameter of less than or equal to 0.2 µm and an aspect ratio of less than or equal to 1.3.

There was a further inhibition in the $N_2$ permeation amount of the DDR-type zeolite membrane in Sample No. 1 to No. 5 in which the crystallinity index was greater than or equal to 60.

INDUSTRIAL APPLICATION

According to the present invention, utility is enabled in the field of separation membranes due to enhancement to the permeation characteristics and separation characteristics of a DDR-type zeolite membrane.

REFERENCE SIGNS LIST

10 SEPARATION MEMBRANE STRUCTURE
20 SUPPORT
21 SUBSTRATE
22 INTERMEDIATE LAYER
23 SURFACE LAYER
30 DDR-TYPE ZEOLITE MEMBRANE

The invention claimed is:

1. A method for manufacturing a DDR-type zeolite membrane comprising the steps of:
    forming DDR-type zeolite seed crystals by heating a starting material solution containing a nucleus that includes DDR-type zeolite seed crystals for greater than or equal to 24 hours and less than or equal to 92 hours,
    coating a slurry containing the DDR-type zeolite seed crystals onto a surface of a support, the DDR-type zeolite seed crystals having an average particle diameter of greater than or equal to 0.147 µm and less than or equal to 0.2 µm and an average aspect ratio of greater than or equal to 1.1 and less than or equal to 1.3, and
    causing crystal growth of the DDR-type zeolite seed crystals,
    wherein a concentration of the nucleus in the starting material solution is greater than or equal to 0.4 mass % and less than or equal to 3.00 mass %,
    the starting material solution is heated to greater than or equal to 110 degrees C. and less than or equal to 150 degrees C.,
    an average particle diameter of the nucleus is greater than or equal to 0.100 µm and less than or equal to 0.200 µm; and
    the DDR-type zeolite membrane has an $N_2$ permeation amount of equal to or less than 0.0034 L/min·m².

2. The method for manufacturing a DDR-type zeolite membrane according to claim 1, wherein a concentration of the nucleus in the starting material solution is greater than or equal to 0.5 mass % and less than or equal to 3.00 mass %.

* * * * *